United States Patent
Smeets et al.

(10) Patent No.: US 9,432,349 B2
(45) Date of Patent: Aug. 30, 2016

(54) SERVICE ACCESS AUTHENTICATION METHOD AND SYSTEM

(75) Inventors: Bernard Smeets, Dalby (SE); Mats Näslund, Bromma (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 172 days.

(21) Appl. No.: 14/125,859

(22) PCT Filed: Jun. 13, 2012

(86) PCT No.: PCT/EP2012/061176
§ 371 (c)(1),
(2), (4) Date: Mar. 13, 2014

(87) PCT Pub. No.: WO2012/171946
PCT Pub. Date: Dec. 20, 2012

(65) Prior Publication Data
US 2014/0196127 A1 Jul. 10, 2014

Related U.S. Application Data

(60) Provisional application No. 61/498,798, filed on Jun. 20, 2011.

(30) Foreign Application Priority Data

Jun. 16, 2011 (EP) .................................. 11170110

(51) Int. Cl.
*H04L 29/06* (2006.01)
(52) U.S. Cl.
CPC ........... *H04L 63/08* (2013.01); *H04L 63/0815* (2013.01); *H04L 63/0884* (2013.01)
(58) Field of Classification Search
CPC ............... H04L 63/08; H04L 63/0815; H04L 63/0884; H04L 63/0807; H04L 63/0823; H04L 63/083; H04L 9/3226; H04L 9/3263

USPC ............................................................ 726/5
See application file for complete search history.

(56) References Cited

U.S. PATENT DOCUMENTS 5,881,235 A 3/1999 Mills
6,269,244 B1 7/2001 Alperovich et al.
(Continued)

FOREIGN PATENT DOCUMENTS

WO 2010035949 A2 4/2010

OTHER PUBLICATIONS

Myers, M., et al., "X.509 Internet Public Key Infrastructure Online Certificate Status Protocol—OCSP", RFC 2560; PKIX OCSP; Network Working Group; Standards Track; Jun. 1999. pp. 1-21.
(Continued)

*Primary Examiner* — William Goodchild
(74) *Attorney, Agent, or Firm* — Murphy, Bilak & Homiller, PLLC

(57) ABSTRACT

An access authentication system for authenticating a subscriber of a service, the access authentication system comprising an operator access authentication system and one or more private access authentication systems, each private access authentication system being communicatively connectable with the operator access authentication system, the operator access authentication system being adapted to provide one or more authentication functions for facilitating authentication of subscribers of the service based on respective subscriber authentication data items associated with credentials of the subscriber; wherein each private access authentication system is adapted to communicate one or more subscriber authentication data items to said operator access authentication system; and wherein each private access authentication system is further adapted to communicate one or more verification data items indicative of the private access authentication system operating in at least one predetermined state.

13 Claims, 2 Drawing Sheets

(56) References Cited

U.S. PATENT DOCUMENTS

| | | | |
|---|---|---|---|
| 6,445,920 B1 | 9/2002 | Pfundstein | |
| 6,651,090 B1 | 11/2003 | Itabashi et al. | |
| 6,658,259 B2 | 12/2003 | McIntosh | |
| 7,149,516 B2 | 12/2006 | Armbruster et al. | |
| 2003/0105980 A1* | 6/2003 | Challener | G06F 21/46 726/7 |
| 2009/0205028 A1* | 8/2009 | Smeets | G06F 21/445 726/6 |
| 2010/0146274 A1* | 6/2010 | Naslund et al. | 713/168 |
| 2012/0047551 A1* | 2/2012 | Pattar | H04W 4/00 726/1 |

OTHER PUBLICATIONS

Third Generation Partnership Project, "3GPP TR 33.812 V9.2.0 (Jun. 2010)", 3rd Generation Partnership Project; Technical Specification Group Services and System Aspects; Feasibility study on the security aspects of remote provisioning and change of subscription for Machine to Machine (M2M) equipment (Release 9). Jun. 2010. pp. 1-87.

Author Unknown, "TCG Specification Architecture Overview", Specification; Revision 1.3; Trusted Computing Group, Inc. Mar. 28, 2007. pp. i-54.

3rd Generation Partnership Project, "3GPP TS 33.204 9.0.0 (Dec. 2009)," 3rd Generation Partnership Project; Technical Specification Group Services and System Aspects; 3G Security; Network Domain Security (NDS); Transaction Capabilities Application Part (TCAP) user security (Release 9). Dec. 2012. pp. 1-24.

Author Unknown, "ARM Security Technology; Building a Secure System Using Trustzone® Technology," ARM Whitepaper. ARM Limited. pp. 1-108.

\* cited by examiner

SERVICE ACCESS AUTHENTICATION METHOD AND SYSTEM

TECHNICAL FIELD

Disclosed are a system and corresponding method for authenticating access to a service.

BACKGROUND

Many communications networks comprise functionality for controlling and granting to subscribers access to the communications network. Typically, such access is granted to subscriber devices subject to a verification of subscriber credentials for authenticating said subscriber device. For example, access to many communications systems, e.g. mobile communications network systems, is limited to subscribers of a communications service that utilises the communications network.

In the context of the GSM/CDMA system and similar mobile communications systems, the mobile switching center (MSC) is the primary service delivery node, responsible for routing voice calls and SMS as well as other services (such as conference calls, FAX and circuit switched data). The MSC sets up and releases the end-to-end connection, handles mobility and hand-over requirements during the call and takes care of charging and real time pre-paid account monitoring.

Other important entities in the GSM system are the Home Location Register (HLR) and the Authentication Centre (AuC) connected to the MSC. In a wireless network, the HLR is the central location where user information is stored, such as account numbers, features, preferences, permissions, etc. The Home Location Register (HLR) was introduced in GSM as an entity that contains the functions needed to administer and check the subscriber of the mobile network. In conjunction with the Visitor Location Register (VLR) and the Mobile Switching Center (MSC), the HLR enables subscribers to send and receive calls within the home network and to travel ("roam") within other networks while still maintaining access to familiar and desired services.

When the GSM system evolved into the UMTS (3G) system and recently even into the LTE system, the HLR kept this role. Other mobile network systems like AMPS, DAMPS, CDMA, etc have similar network entities.

Another important function of the mobile network is the authentication centre (AuC). The AuC is connected with the HLR and provides a function to authenticate each SIM card through which a mobile phone attempts to connect to the GSM core network (typically when the phone is powered on and/or when making a call). Once the authentication is successful, the HLR is used to manage the SIM and services described above. An encryption key is also generated that is subsequently used to protect (encrypt) wireless communications (voice, SMS, etc.) between the mobile phone and the GSM core network.

The AuC uses subscriber data that resides locally and data that resides in the subscriber's SIM card (in case of UMTS and LTE it is called a USIM card), and provides authentication mechanisms that allow the network to authenticate its subscribers. Furthermore, the AuC and the SIM card share the knowledge of the authentication algorithm and its parameters that will be used during the authentication procedure. For the purpose of the present description the subscriber data (comprising e.g. subscriber identifiers) and the authentication algorithm/parameters are referred to as the credentials of the subscriber.

This setup has over the years proven to give a secure way of enforcing network access control in mobile networks and has even been extended to provide security for services such as IMS. A key component of IMS is the Home Subscriber Server (HSS), which may be regarded as an evolved version of the HLR that provides a much wider range of features and is meant to act as a master repository of all subscriber and service-specific information. It combines the HLR/AuC (Authentication Center) functionality of GSM networks and also provides information specifically required by the IMS network. SIM based authentication can also be used in other access technologies, e.g. Wireless LAN where the AuC functionality is provided by a so called AAA Server (Authentication, Authorization and Accounting).

However, the above setup has certain logistics implications which make it difficult for wholesale solution providers to offer consumer devices for specific services. The main problem is that subscriber credentials must be provisioned both into the AuC and the device. In practice the latter is solved by forcing the subscriber to acquire a SIM card from the operator and to insert this card into the device. When the subscriber wants to change operator he/she gets a SIM card from another operator and removes the first SIM card and replaces it with the new one. This has proven to be a well-functioning system for individual subscribers. However, with the increasing use of mobile network technology for Machine to Machine (M2M) devices like (remote) metering devices, the above setup involves a number of disadvantages, because the provisioning of the SIM cards into the device and due to the way one can support flexible initial selection and change of operator.

Even though a mechanism has been described in U.S. Pat. No. 7,149,516 that allows users to modify their own subscriber profiles by accessing a personal home location register which is modifiable directly by a user, this approach does not address authentication issues towards another operator network and this prior art only allows a user to manage subscriptions that already exist; it does not provide any mechanism that would enable the user to conveniently add remotely an entire subscription (identities and credentials) for a new or existing device.

As explained earlier, the AuC comprises the subscriber credentials and these are mirrored in the SIM card which is inserted into the device. Examples of subscriber credentials comprise an IMSI (International Mobile Subscriber Identity), one or more cryptographic keys, one or more authentication algorithms, one or more session key algorithms, one or more algorithm parameters. The operator will normally request a third party (e.g. SIM card vendor) to produce a set of SIM cards and then populates his AuC with the credentials on those cards. When a device owner wants to use this operator's network he receives or buys (prepaid) one of the operator's SIM cards. This works well for personal devices although for some devices the removable SIM card based on UICC technology is a cost factor and is replaced by fixed mounted SIMs.

However, there are a number of scenarios where the prior art mechanisms have severe limitations. For example, if a utility company wants to deploy metering devices that report data over the mobile network, the problem arises that the manufacturer of the devices cannot know which operator the utility company wants to use. Thus the device manufacturer cannot pre-provision operator specific credentials into the devices and, as with traditional mobile devices, must leave this task to the device user which in this case is the utility company. The utility company must then do something with the devices (insert a SIM card or reprogram them) to make them usable on the chosen operator's network. As soon as the devices can make contact to the operator's network other procedures can then be used to provision the final credentials if so needed (i.e. in case initial contact was based on some preliminary and or group credentials).

Similar problems are found in connected consumer electronics where an end user has a set of personal devices (phones, digital cameras, TV sets. PCs, etc) that use mobile networks to communicate. Even with only a handful of devices, it tends to be very cumbersome for the user to acquire separate SIM cards for each device.

One solution that has been proposed involves the so-called MCIM (Machine Communications Identity Module), or "Soft SIM", see 3GPP TR33.812. This solution addresses the provisioning problem on the device side, but still has several shortcomings on the user/network side. For example, if a user wants to change operator for his devices, the change-of-operator protocol must be executed once per device. If the user has many devices, e.g. hundreds or even thousands of remote metering devices of a utility company, this is a prohibitive task.

SUMMARY

Disclosed herein are embodiments of an access authentication system for authenticating a subscriber of a service, the access authentication system comprising an operator access authentication system and one or more private access authentication systems, each private access authentication system being communicatively connectable with the operator access authentication system, the operator access authentication system being adapted to provide one or more authentication functions for facilitating authentication of subscribers of the service based on respective subscriber authentication data items associated with credentials of the subscriber; wherein each private access authentication system is adapted to communicate one or more subscriber authentication data items to said operator access authentication system; and wherein each private access authentication system is further adapted to communicate one or more verification data items indicative of the private access authentication system operating in at least one predetermined state.

Hence, embodiments of the access authentication system disclosed herein facilitate a secure provision of one or more private access authentication systems that may provide authentication data to an operator authentication system. Consequently, a subscriber may set up his/her private access authentication system and thus perform the provisioning of the subscriber device credentials to the private access authentication system. The private access authentication system then communicates authentication data items associated with the credentials to an operator access authentication system operated by a service operator providing the service. This allows the operator access authentication system to facilitate authentication of the subscriber's devices without the need for registering the individual subscriber devices and their associated credentials with the operator access authentication device and without the need for modifying the individual subscriber devices. Furthermore, the operator may establish that the private access authentication system can be trusted, e.g trusted to handle the credentials.

It will be appreciated that the term subscriber and subscriber device as used herein refer to any user or user device authorised to access the service, e.g. a communications device or any other electronic device authorised to access the service. The term communications device is intended to comprise stationary and portable communications equipment. The term portable communications equipment includes all equipment such as mobile telephones, pagers, communicators, electronic organisers, smart phones, personal digital assistants (PDAs), handheld computers, laptop computers, or the like, using fixed/wired (e.g. xDSL, Ethernet, optical) or wireless (e.g. CDMA, GSM, LTE, UMTS, WLAN, WiMAX) access technology.

The service may be a communications service such as a telecommunications service provided by a communications network. Hence, in some embodiments access to the service may comprise access to a communications network, such as a mobile communications network. Accordingly, the operator access or service authentication system may comprise an authentication centre function compatible with the GSM system or any other suitable function for facilitating authentication of a subscriber of the service such as a communications network. Embodiments of the operator access authentication system may include additional functions, e.g. functions for storing and/or managing subscriber data, e.g. an operator HLR.

Similarly, the private access authentication system may comprise an authentication centre function compatible with the GSM system or any other suitable function for facilitating authentication of a subscriber of the service such as a communications network. Embodiments of the private access authentication system may include additional functions, e.g. functions for storing and/or managing subscriber data, e.g. a private HLR.

For example, a subscriber may set up his private access authentication system, e.g. the subscriber's own AuC connected to the subscriber's own HLR, and thus perform the provisioning of the subscriber credentials. Consequently, there is no need to replace the credentials when changing operator. To get access to an operator's network, the subscriber registers his HLR/AuC at a network operator whose existing HLR/AuC is modified to use the subscriber HLR/AuC instead when one of the devices associated with the subscriber wants to get access to the network or to some other service.

Generally, the term access authentication system is intended to comprise a system comprising one or more devices of a service delivery system such as one or more devices of a computer network or a telecommunications system, where the access authentication system comprises functionality facilitating subscriber authentication, e.g. responsive to a subscriber device attempting to access a service provided by the service delivery system. In particular the authentication system may make use of or have stored therein authentication data items and/or subscriber credentials, e.g. credentials comprising subscriber data and data indicative of an authentication algorithm and its parameters for use during the authentication procedure.

In the context of a mobile telecommunications system, embodiments of the access authentication system may be embodied by a suitably configured AuC, HLR, MSC/VLR and/or combinations thereof.

The term operator access authentication system is intended to refer to an access authentication system operated by the operator of the service delivery system, while the term private access authentication system is intended to refer to an access authentication system operated by an entity different from an operator of the service delivery system, e.g. by a subscriber of the service. The operator access authentication system is thus located with the service provider, e.g. a telecommunications service provider, while the private access authentication system is not located with a service provider. Hence, in the context of a mobile telecommunications system, embodiments of an operator access authentication system may be embodied as an MSC/VLR, an operator AuC, an operator HLR, a Mobile Management Entity (MME) or a combination thereof.

The term authentication data item is intended to refer to any data derivable from and/or associated with the subscriber credentials stored by the access authentication system which data allows the receiving entity to authenticate the subscriber attempting to access the service. In particular, the authentication data item may be derivable from subscriber data, an authentication algorithm and its parameters that are used during the authentication procedure. An example of an authentication data item may include a challenge or a response of a challenge response mechanism, e.g. between the access authentication system and a subscriber identity module of the subscriber device. For example, the authentication data item may be derived from a shared secret and a subscriber identity identifier, e.g. to generate a challenge/response for identification purposes, and optionally an encryption key for use in subsequent communications.

Even though present standards (see e.g. Network Domain Security (NDS); Transaction Capabilities Application Part (TCAP) user security (Release 9); 3rd Generation Partnership Project; Technical Specification Group Services and System Aspects; 3G Security; 3GPP TS 33.204 9.0.0 (2009-12)) describe how through secure communication two operators can exchange data, an increased security is required in the presence of private access authentication systems.

In some embodiments, the verification data item may be an attestation data item, e.g. of a remote attestation mechanism. The verification data item may be indicative of the private access authentication system operating at least one predetermined hardware and/or software component and/or indicative of the private access authentication system operating in at least another trusted state. It will be appreciated however, that not all state parameters of the state of the private access authentication system may have to be verified. In some embodiments only one or some state parameters, sufficient for establishing that the private access authentication system operates in one of a number of possible trusted states, is verified. Alternatively or additionally, each private access authentication system is securely connected to the operator access authentication system allowing verification of the private access authentication system by the operator access authentication system.

When the private access authentication system communicates one or more attestation data items indicative of the private access authentication system operating a hardware and/or software acceptable by the operator access authentication system and/or another verification data item indicative of the private access authentication system operating in at least one predetermined state, additional measures to combat misuse of the network are provided, thus allowing verification and monitoring of the subscriber's private access authentication system. Accordingly, in some embodiments, the entity (e.g. a server computer) on which the private access authentication system is running can be (remotely) verified by the chosen operator so it is booted in the correct manner and is executing the approved (secure) software. Alternatively or additionally, the operator access authentication system may verify that at least a subset of the software executed by the private access authentication system is approved or trusted by the operator access authentication system. Generally, in embodiments of the method described herein, the operator access authentication system and/or another verification system may receive the verification data item and verify that the private access authentication system operates in a trusted state.

Thus, embodiments of the network access authentication system described herein may use the roaming capabilities in the operator's networks to introduce a private Authentication center, optionally in connection with a private HLR. For the purpose of the present description the private HLR will also be referred to as pHLR and the private Authentication Centre as pAuC. The pAuC comprises the subscriber credential data that is needed for authentication and the pHLR may contain other subscriber data relating to the type of service and possibly device specifics. Furthermore, embodiments of a pAuC provide functionality allowing a network operator to verify the pAuC. The pHLR and/or pAuC may comprise a management interface by which the owner of the pHLR/pAuC can control the pHLR/aAuC and by which new credentials can be added, replaced/updated, or deleted in a secure way (e.g. using a cryptographically secure connection, e.g. SSH. or a physically secure connection e.g. IR, NFC or USB cable). For example, a subscriber device to be added (inserted) into the pAUC/pHLR could export a copy of its credentials or other information over such an interface.

The private authentication system may run on a trusted platform which may implement secure boot and enforce that only approved (e.g. correctly signed) code can execute. This can, for example, be achieved by using TCG (Trusted Computing Group) technology where a TPM (Trusted Platform Module) or another suitable trusted computing platform is operable to control that only correct software components are started, see e.g. the TPM Main Specification Level 2 Version 1.2, Revision 103 (also available as the international standard ISO/IEC 11889). Generally, a trusted computing platform is a computing platform suitable for the protection and processing of private or secret data, where the computing platform provides isolated execution environments, where software/data is protected from external interference, and where the trusted computing platform can offer assurances about its behaviour (hardware and software environment). Embodiments of a trusted computing platform may thus include functionality for sealed (e.g. encrypted) storage (e.g. of the aforementioned device credentials) and remote attestation.

The term remote attestation refers to a process of reliably reporting the platform's current state to an authorized remote entity, thus allowing the remote entity to detect changes to the computer that comprises the trusted platform. Remote attestation may be implemented by having the hardware generate a certificate stating what software is currently running. The computer can then present this certificate to a remote entity to show that unaltered software is currently executing. Remote attestation may be combined with public-key encryption so that the information sent can only be read by the programs that presented and requested the attestation, and not by an eavesdropper. For example, the TCG technology supports remote attestation which can thus be used by the chosen operator to inspect the proper functioning of the private access authentication system. Towards this end the operator's access authentication system may be augmented to support such platform verification procedures. In the context of e.g. the GSM and similar mobile communications networks, the modified operator access authentication system may comprise a modified HLR and/or modified AuC which will also be referred to herein as oHLR and oAuC, respectively. Hence, the verification data item may comprise a remote attestation result generated by the trusted platform, e.g. a digital attestation certificate generated by the trusted platform or any other suitable signature of the trusted platform.

In the example mentioned earlier the utility company may establish its own pHLR and pAuC for the devices owned by (or otherwise administrated/operated by) the utility company and the device manufacturer may pre-provision the devices and make the data for the pHLR and pAuC available to the utility company after it has purchased the devices (e.g. via a web portal). Alternatively, just when the device is to become operable, at least parts of the credentials may be generated "on request" by the device and/or the pAuC (using e.g. locally generated random/pseudorandom values) after which the device and pAuC synchronize the credentials over a secure interface as already discussed. Next the utility company may register its pHLR and pAuC at the operator of choice and the operator can charge the utility company for the use of his network using the same mechanisms as for roaming subscribers, or, for the mechanisms for the operator's own subscribers, according to agreement. If/when the utility company wants to change operator it negotiates an agreement with a new operator and then instructs its devices to select this new operator's network. In contrast to prior art arrangements, this instruction could be done by a single (secured) multi-cast message rather than per-device change of operator. On the network side all that is needed is for the new operator to re-configure his operator access authentication system (e.g. the new oHLR/oAUC) to "point" or re-direct authentication data signalling to the pHLR and pAuC of the utility company. The operator that is chosen by the utility company on the other hand wants to be able to verify that the utility company's pHLR/pAuC can be trusted.

The present invention relates to different aspects including the setup of interacting operator and private HLR/AuCs described above and in the following, corresponding systems, methods, and products, each yielding one or more of the benefits and advantages described in connection with one of the above-mentioned aspects, and each having one or more embodiments corresponding to the embodiments described in connection with at least one the above-mentioned aspects.

More specifically, according to another aspect, a method is disclosed for facilitating, by an operator access authentication system, authentication of a subscriber device requesting access to a service; the operator access authentication system being adapted to provide one or more authentication functions for facilitating authentication of subscribers of the service based on respective subscriber authentication data items, the method comprising:
  receiving a subscriber authentication data item from a private access authentication system communicatively connected with the operator access authentication system, said subscriber authentication data item being indicative of one or more subscriber credentials;
  responsive to the received subscriber authentication data item and responsive to a verification of a state in which the private access authentication system is operated, providing one or more authentication functions for facilitating authentication of a subscriber associated to said subscriber credentials.

The one or more authentication functions for facilitating authentication of a subscriber provided by the operator authentication system may include performing an authentication process and/or forwarding authentication data, e.g. the received authentication data item or data derived therefrom, to another entity which in turn may perform the actual authentication process and provide access to said service.

The verification of the state in which the private access authentication system is operated may be performed at least partly by the operator access authentication system, e.g. responsive to a verification data item received from the private access authentication system. Alternatively or additionally the verification may be performed at least partly by another entity, e.g. a verification system which system may then communicate the verification result or an intermediate result to the operator access authentication system.

Further disclosed herein is a method of facilitating, by a private access authentication system connected to an operator access authentication system, authentication of a subscriber device requesting access to a service; the operator access authentication system being adapted to provide one or more authentication functions for facilitating authentication of subscribers of the service based on respective subscriber authentication data items, the method comprising:
  communicating a subscriber authentication data item to the operator access authentication system, said subscriber authentication data item being indicative of one or more subscriber credentials and facilitating the operator access authentication system to selectively grant or deny a subscriber device access to the communications network;
  communicating at least one verification data item indicative of a state in which the private access authentication system is operated and facilitating determination whether said state is trustable by the operator access authentication system.

The private authentication system may communicate the subscriber authentication data item to the operator access authentication system directly or via another entity. The private authentication system may communicate the verification data item to the operator access authentication system and/or to another system for verification of the state of the private access authentication system.

Further disclosed are an operator access authentication system and a private access authentication system for use in a service access authentication system as defined herein. Each of the operator access authentication system and the private authentication system may be embodied as a server, e.g. a server computer or other data processing system or as a virtualised server using a suitable hardware virtualisation mechanism known as such in the art.

BRIEF DESCRIPTION OF THE DRAWINGS

The above and other aspects will be apparent and elucidated from the embodiments described in the following with reference to the drawing in which.

DETAILED DESCRIPTION

Figure 1:
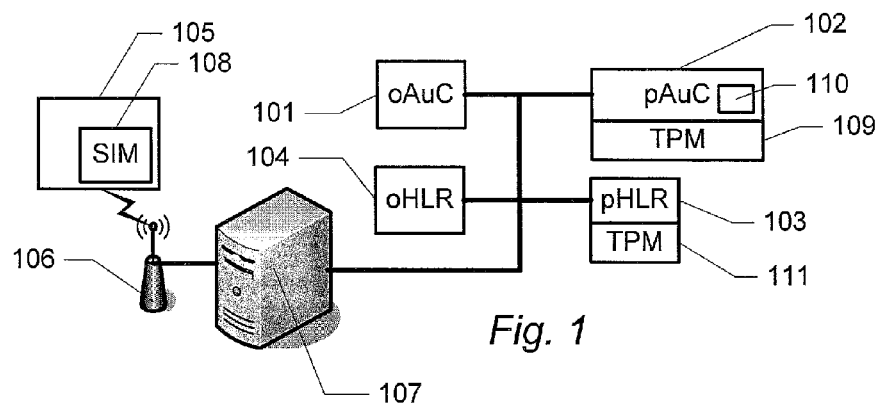
FIG. 1 shows a schematic block diagram of an example of an authentication system.

FIG. 1 shows a schematic block diagram of an example of an access authentication system. The access authentication system of FIG. 1 is a network access authentication system facilitating authentication of subscriber devices that request access to a communications network such as a mobile telecommunications network. The network authentication system comprises an operator access authentication system 101 embodied as an operator authentication centre (oAuC) and a private access authentication system 102 embodied as a private authentication centre (pAuC). It will be appreciated, however, that the operator access authentication system 101 may be embodied as an operator authentication centre (oAuC), an MSC/VLR, an operator HLR (oHLR), or a combination thereof, and a private access authentication system 102 may embodied as a private authentication centre (pAuC), a private HLR, or a combination thereof.

The pAuC may be connected to a private home location register (pHLR) 103. Alternatively, the pAuC may be embodied as a component of a private home location register pHLR operated by a subscriber. Similarly, the oAuC of FIG. 1 is operated by a network operator and may be connected to an operator Home Location Register (oHLR) 104. It will be appreciated that, even though only a single one of each of the above entities is shown in FIG. 1, embodiments of an access authentication system may comprise respective pluralities of one, some or each of these entities. Furthermore, in some embodiments, the subscriber may only operate a pAuC operable to communicate with an oHLR of the operator. In this case, the IMSI may be associated with the oHLR and a request for authentication data would first be sent to the oHLR. The oHLR may then have information that the authentication data items should be requested from the pAuC (e.g. an URL, IP address or similar of the pAuC is configured in the oHLR), but all other functions may then be done at the oHLR.

The pAuC is a system, e.g. a device or a hardware and/or software component of a device, that provides functionality for facilitating authentication of a subscriber device 105 that attempts to connect to a mobile communications network, e.g. a GSM network, via a base station 106 and a mobile switching centre (MSC) 107. In some embodiments, the authentication system may perform the authentication directly, while in other embodiments, the authentication system may instead generate data for use in the authentication process. For example, in the context of GSM, the pAuC may generate so-called triplets or vectors for the MSC to use during the authentication procedure. In the case of e.g. Wireless LAN access operating in accordance with 3GPP TS 33.234; on the other hand, the authentication decision (accept/reject) could be made at least partly by the pAuC itself.

The subscriber device 105, e.g. a mobile telephone, a computer, or any other electronic device that can access the communications network, comprises a subscriber identity module (SIM) 108. The SIM comprises subscriber credentials for use in the authentication process. It will be appreciated, however, that the subscriber device may comprise any other suitable storage medium for securely storing subscriber credentials. Examples of suitable mechanisms for storing subscriber credentials include a "Soft SIM" type of solution, a physical UICC card, and "hard-wired" credentials built into the device by the device manufacturer or even credentials stored in a (protected) file on the device. Even though only a single subscriber device is shown in FIG. 1, it will be appreciated that embodiments of a network access authentication system may provide access authentication to a plurality of subscriber devices, each with their own credentials and means for storage of said credentials.

The security of the authentication process may depend upon a shared secret between the pAuC and the SIM. Accordingly, the pAuC also comprises a storage medium 110 for storing subscriber credentials. The shared secret may be securely burned or otherwise programmed into the SIM during manufacture and is also securely replicated onto the pAUC. This shared secret is thereafter normally never transmitted between the pAUC and SIM, but rather combined with the IMSI to produce a challenge/response for identification purposes and an encryption key for use in over the air communications.

Hence, as will be appreciated from the above, the authentication capability of the pAuC may be similar to that of a normal AuC of prior art communications networks. However, the pAuC is now owned and operated by the subscriber and not by an operator. Yet the pAuC is, like in a roaming setup, responsible for providing the authentication data items leading to access to the mobile network. As the subscriber operates its own AuC, the subscriber can perform the provisioning of the subscriber credentials and there is no need to replace the credentials when changing operator. To get access to an operator's network the subscriber registers his/her pAuC at a network operator whose existing oHLR and/or oAuC is modified to use the subscriber pAuC instead when one of the subscriber devices wants to get access to the network. Thus, in some embodiments, the oHLR may selectively, and responsive to the identity of the requesting subscriber device, contact the oAuC or the pAuC to obtain authentication data for said subscriber device. In alternative embodiments, the oHLR may always contact the oAuC which in turn may, dependent on the identity of the subscriber device, forward the request for authentication data to a corresponding pAuC.

The pAuC runs on a trusted (execution) platform 109. The pHLR may run on the same or a similar trusted platform 111. A platform is referred to as "trusted", if it is capable in securing the execution of authorized (e.g. correctly signed) software, e.g. based on an immutable root of trust function in the platform (e.g. the hardware of a virtualized computation platform). In one embodiment, the trusted platform further provides functionality allowing a remote entity to securely verify that the platform has started in the correct manner and is running the correct software and/or is otherwise operated in trusted state. Such functionality is often called (platform) attestation. Several techniques for secure boot based on a root of trust exist.

For example, the trusted platform may comprise a Trusted Platform Module (TPM) implementing TCG (Trusted Computing Group) technology. The TPM (Trusted Platform Module) may control that only correct software components are started. The TCG technology also supports remote attestation which can be used by the chosen operator to inspect the proper functioning of the pAuC. In particular, the TPM contains the keys and mechanisms for the verification of the software components to be started and to perform attestation of its state (see e.g. TCG Specification, Architecture Overview, Specification, Revision 1.3, March 2007). Alternatively or additionally, other solutions, for example the TrustZone technology (see e.g. "ARM Security Technology, Building a Secure System using TrustZone® Technology", ARM Whitepaper, http://infocenter.arm.com/help/topic/com.arm.doc.prd29-genc-009492c/PRD29-GENC-009492C_trustzone_security_whitepaper.pdf), may be used for secure boot. Alternatively or additionally, proprietary attestation protocols can be used as well. The attestation functions may be combined with, for example, a verification of the validity of a platform cryptographic certificate. Combinations of one or more of such solutions may generally be referred to as platform verification. For the purpose of the present description, the term platform verification may at least comprise the verification of a platform certificate, e.g. using OCSP (see e.g. RFC 2560, X.509 Internet Public Key Infrastructure Online Certificate Status Protocol—OCSP).

As another option, the operator could provide the executable code implementing the pAuC functionalty. This could be done by using other techniques part of the TPM standards, known as sealing. Here, the code is sent in encrypted form (e.g. from the oHLR 104) to the pAuC 102. The code can only be decrypted by a key known (only) to the TPM 109. Moreover, the TPM 109 locally verifies that the pAuC is in a trusted state before allowing decryption and subsequent execution of the pAuC code. In this embodiment, the operator knows that the code is trusted (since the operator wrote the code) and can trust that the code will only be executed in allowable/trusted states.

It will be appreciated that the above platform verification mechanisms more generally allow the pAuC to be run in "The Cloud" which may have advantages from an availability point of view, in particular for personal users. The pAuC may then be a virtual machine (VM) that may migrate between different physical platforms while the platform trust can be remotely verified as discussed herein. For example, a so called hypervisor or virtual machine monitor (e.g. XEN or KVM) may be used to provide a virtual machine with its own operating system running only the pAuC/pHLR, thereby further increasing security, by isolating the pAuC/pHLR from other (potentially erroneous or malicious) software running on the same physical host computer.

The remote entity that performs the platform verification process of the trusted platform 109 (and optionally the platform 111) may be the oAuC or another suitable component of the operator network infrastructure, e.g. the operator HLR or some node responsible for security management, e.g. a policy enforcement function. Accordingly, the oAuC and/or another operator network infrastructure component may be adapted to support such platform verification procedures. The attestation may take place when the pAuC and/or pHLR is initially connected with the oAuC/oHLR and/or be repeated intermittently, e.g. once per authentication data item request, once per added credential/device, once per day, etc, depending on policy and/or agreement between user and operator.

When a subscriber device 105 requests access to the operator's network via a base station 106, and the operator detects that the subscription is related to a subscriber device authentication of which is not managed by the oAuC, the operator contacts the pAuC and requests the authentication vectors associated with the subscriber credentials of the subscriber device 105. Detection that the subscription is associated with an pAuC/pHLR may be done by the MSC, by the oHLR or by the oAuC. In case a special IMSI format is used for subscriptions associated with pAuC/pHLRs, the detection could be made by the MSC. If, on the other hand, the IMSI is associated with a normal operator's IMSI space, the detection may need to be done either at the oHLR or oAuC. In either case, the entity which detects that the subscription is related to a pAuC/pHLR may then be configured with the address (e.g. URL or IP address) of the associated pAuC/pHLR.

In order to achieve an efficient system this request may be combined with a platform verification request that may use the attestation capability of the trusted platform 109. The combined authentication vector request may be formed as $$\text{New auth vect req} = \{\text{old auth vect req, nonce, proof\_request}\} \quad (1)$$

Where proof_request indicates the type of proof the oAuC (or in general, the entity requesting the attestation) wants to receive from the pAuC. Preferably the above is signed by the oAuC so the pAuC can verify the origin of the request. The nonce is introduced to prevent replay attacks. The old_auth_vect_req may be a conventional request for authentication vectors from an AuC known as such.

The pAuC may then respond to the above request by the following combined authentication response:

$$\text{New auth vect resp} = \{\text{auth vector(s), proof\_answer, sign\_pAuC}\} \quad (2)$$

The pAuC signature sign_pAuC may be over auth vector(s), proof_answer, and the nonce. This allows the receiving entity to verify the correct origin of the data and that the data is not a repetition. It may be noted that the proof_answer may include TPM signatures of possible attestation requests (depending on the actual proof_request). It will be appreciated, however, that the actual details of the proof_request and proof_answer depend on the details of how the pAuC can prove that it is authentic and running the correct software. Signing can be done using any public key cryptographic signing method, e.g. based on RSA or on Elliptic curves. It will further be appreciated that the pAuC may send the above response to the oHLR which may comprise functionality for performing platform verification. In some embodiments, the response may be sent to the oHLR via a pHLR associated with the pAuC.

Figure 2:
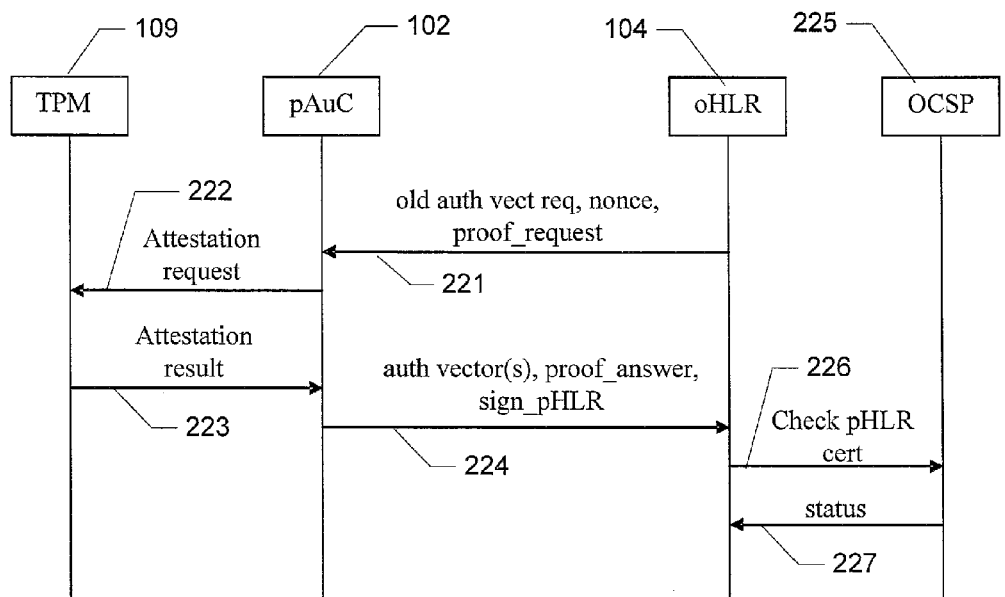
FIG. 2 illustrates an embodiment of a process for access authentication and platform verification.

FIG. 2 illustrates an embodiment of a process for access authentication and platform verification using a combined authentication vector request and pHLR/pAuC verification. The process may be performed by a network authentication system, e.g. the system described in FIG. 1 comprising an oAuC 101, an oHLR 104, and a pAuC 102. In the example of FIG. 2, the platform verification is performed by the oHLR 104 and is based on TCG TPM technology. Accordingly, the pAuC 102 is executed on a TPM 109. Alternatively, the platform verification may be performed by another network entity, e.g. the oAuC.

The process may be initiated by the oHLR although it may be implemented as a new subfunction of an existing HLR, or it could even be made part of the oAuC. For the purpose of the present description, it is assumed that the trigger originates from the oHLR itself.

The oHLR sends a request for authentication data 221 including a verification request, e.g. of the form (1) described above, to the pAuC associated with the subscriber device requesting access to the network. As described above, the request includes a verification request in the form of a command, denoted proof_request, to the pAuC to construct a proof. For example, the request may ask for proofs of the presence of certain subsystems in the pAuC. For the purpose of simplicity of the present description, the request is assumed to be for a proof that the pAuC is booted correctly and that it has knowledge of a pAuC authentication subsystem private key. It will be appreciated that, in some embodiments, an attestation request may be issued for each request for authentication data so as to provide a high level of security, while in other embodiments the attestation request may be issued intermittently instead and/or in addition to requests associated with a request for authentication data.

Upon receipt of the request 221, the pAuC uses the TPM 109 to generate a proof that it was booted correctly. In FIG. 2, this is illustrated by an attestation request 222 communicated by the pAuC to the TPM 109. This is a known procedure as such and specified in the TCG specifications (see e.g. TCG Specification, Architecture Overview, Specification, Revision 1.3, March 2007). The proof is returned to the pAuC by the TPM as the attestation result 223. The attestation request may comprise a random challenge which may be the nonce from the message 221 sent by the oHLR, or it can be a function of this nonce and the auth vector data.

The pAuC may now construct the proof_answer as being the tuple:

```
Proof_answer = {
        boot_proof: attestation result;
        pAuC_auth_private_key_proof: RSA_signature;
    };
Where the RSA_signature is a signature of the earlier mentioned nonce.
```

Note that the sign_pAuC shown in FIG. 2 may be based on another private key than the private key of the authentication subsystem, e.g. it may be the private key related to a roaming agreement between the pHLR and the oHLR.

The pAuC then returns an authentication response 224 e.g. of the form (2) described above, including the proof_answer to the oHLR.

The oHLR may then use an OCSP server 225 to check whether certificates have been revoked, as illustrated by messages 226 and 227. Alternatively the oHLR may rely on distributed Certificate Revocations Lists that are distributed.

If the verification of the pAuC is successful, the oHLR may process the auth_vect in a manner known as such, e.g. as is normally done for a roaming user.

In order to facilitate the provision of subscriber-operated authentication systems, the network infrastructure may be modified to provide routing of requests for subscriber authentication data to the correct pHLR/pAuC. For example, this process may as mentioned be performed by the MSC/VLR of the operator of the base station via which the subscriber device attempts to access the network. The routing may be accompanied by a secure connection (e.g. IPsec or TLS/SSL) set-up for a subsequent transfer of authentication data (so called authentication vectors) using e.g. Radius or Diameter.

Figure 3:
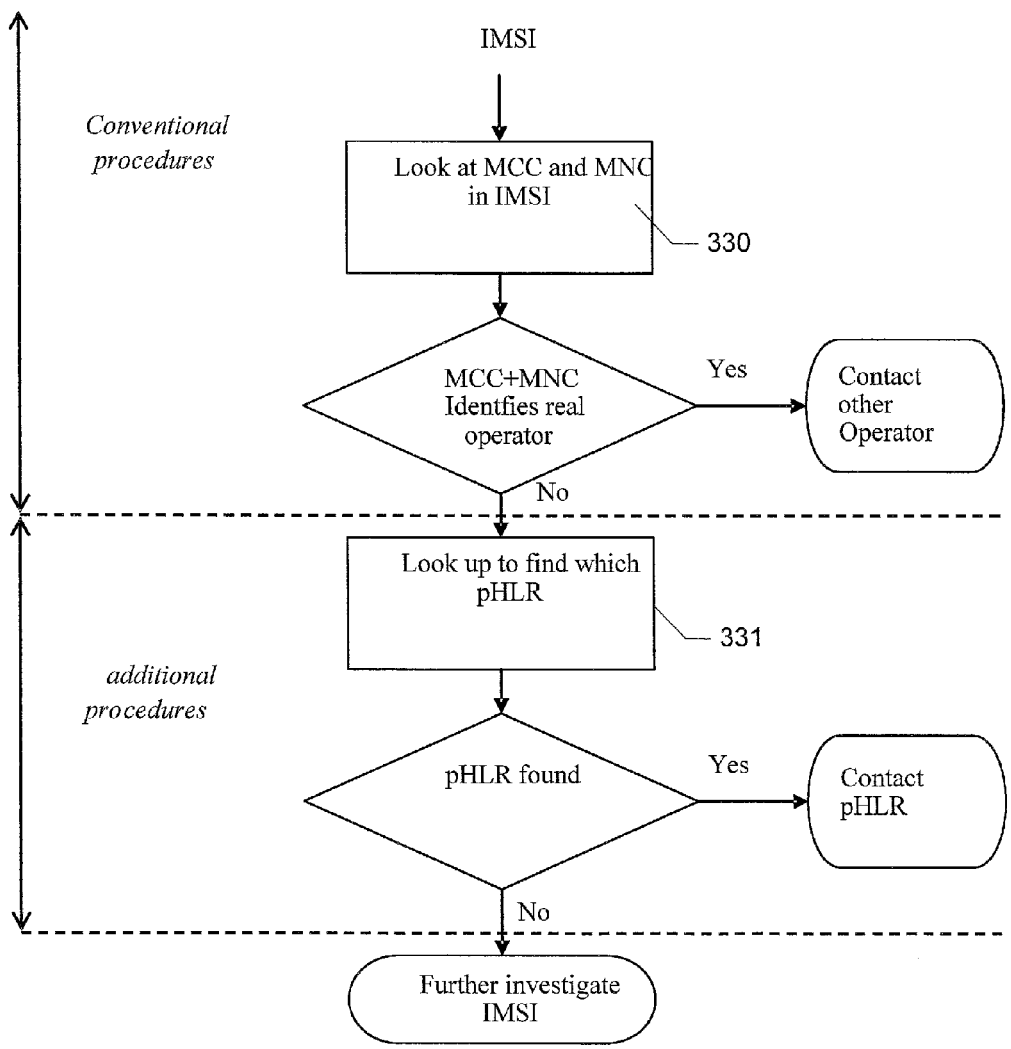
FIG. 3 illustrates a flow diagram of an example of a process of routing requests for authentication data items to a private authentication system.

The operator may know which IMSI numbers are related to which pAuC. In the case of non-roaming devices the simple solution shown in FIG. 3 may be used. This method introduces an additional step 331 in the routing resolution by identifying the IMSIs that belong to one of the pAuCs that are registered. By using, for example, hash tables this look-up can be implemented efficiently in basically constant time complexity. In the example of FIG. 3, the process initially determines in step 330 whether the MCC (Mobile Country Code) and MNC (Mobile Network Code) part of the IMSI point to another operator. If this is the case, the process contacts the identified other operator. Otherwise, in step 331, the process identifies a pAuC associated with the IMSI.

Note that the 15 digit IMSI may not be sufficient when every user may have a pAuC and many devices associated with that pAuC. Therefore, as an option, the following approach may be used.

When the VPLMN (Visible Public Land Mobile Network) detects that the MCC+MNC points to a pAuC/pHLR, the MSIN part is used to identify the pAuC/pHLR and the VPLMN also issues a second identity request (IMSI requests may be issued at any time when the network does not have sufficient information to identify the subscriber according to 3GPP specifications) to identify the device within this pAuC/pHLR. This means that up to 1 Billion pAuC/pHLRs can be supported, each with Billions of devices.

Note that the detection of the pAuCs can be placed prior to the existing procedures. In cases where the devices also need to roam into other networks the same routing information may be distributed to other operators.

Although some embodiments have been described and shown in detail, the invention is not restricted to them, but may also be embodied in other ways within the scope of the subject matter defined in the following claims.

The method, product means, and device described herein can be implemented by means of hardware comprising several distinct elements, and by means of a suitably programmed microprocessor. In the device claims enumerating several means, several of these means can be embodied by one and the same item of hardware, e.g. a suitably programmed microprocessor, one or more digital signal processor, or the like. The mere fact that certain measures are recited in mutually different dependent claims or described in different embodiments does not indicate that a combination of these measures cannot be used to advantage.

It should be emphasized that the term "comprises/comprising" when used in this specification is taken to specify the presence of stated features, integers, steps or components but does not preclude the presence or addition of one or more other features, integers, steps, components or groups thereof.

It should be noted that although the ideas have been described in the setting of controlling and granting access to networks it will be appreciated that the disclosed methods and systems can be used to control and grant access to services in general.

The invention claimed is:

1. A method of operation at an operator access authentication system that authenticates subscriber devices for access to a service provided by a telecommunication network associated with the operator access system, wherein the method comprises:

receiving a request from a subscriber device for access to the service;

detecting that the subscriber device is associated with a private access authentication system that manages subscriber credentials for authenticating the subscriber device with respect to the service;

responsive to said detecting, initiating communications towards the private access authentication system and, in response, receiving verification data and a subscriber authentication data item from the private access authentication system, said subscriber authentication data item associated with the subscriber credentials; and verifying from the verification data that the private access authentication system is operated in a trusted state, and authenticating the subscriber device for access to the service, based on the authentication data item.

2. The method according to claim 1, wherein initiating communications towards the private access authentication system comprises forwarding a request for authentication data to the private authentication system.

3. An operator access authentication system operative to authenticate subscriber devices for access to a service provided by a telecommunication network associated with the operator access authentication system, wherein the operator access authentication system is configured to:

receive a request from a subscriber device for access to the service;

detect that the subscriber device is associated with a private access authentication system that manages subscriber credentials for authenticating the subscriber device with respect to the service;

initiate communications towards the private access authentication system and, in response, receive verification data and a subscriber authentication data item from the private access authentication system, said subscriber authentication data item associated with the subscriber credentials; and responsive to verifying from the verification data that the private access authentication system is operated in a trusted state, authenticate the subscriber device for access to the service according to the subscriber credentials.

4. The operator access authentication system according to claim 3, further configured to identify, based on the received request, the private access authentication system from a set of private access authentication systems; and request from the identified private access authentication system at least one verification data item as said verification data along with the subscriber authentication data item.

5. A method of operation by a private access authentication system connected to an operator access authentication system, wherein the method comprises:

maintaining subscriber credentials for authenticating a subscriber device with respect to accessing a service provided by a telecommunication network;

receiving a request from the operator access authentication system, for authentication of the subscriber device with respect to accessing the service;

responsive to the request, communicating verification data and a subscriber authentication data item to the operator access authentication system, said subscriber authentication data item associated with the subscriber credentials and enabling the operator access authentication system to authenticate the subscriber device for access to the service, and said verification data indicating a state in which the private access authentication system is operated and thereby enabling determination by the operator access authentication system as to whether said state is trustable by the operator access authentication system.

6. A private access authentication system configured to:
maintain subscriber credentials for authenticating a subscriber device with respect to accessing a service provided by a telecommunication network;

receive a request from an operator access authentication system associated with the telecommunication network, for authentication of the subscriber device with respect to accessing the service;

responsive to the request, communicate verification data and a subscriber authentication data item to the operator access authentication system, said subscriber authentication data item associated with the subscriber credentials and enabling the operator access authentication system to authenticate the subscriber device for access to the service, and said verification data indicating a state in which the private access authentication system is operated and thereby enabling determination by the operator access authentication system whether said state is trustable by the operator access authentication system.

7. An access authentication system for controlling and granting access by a subscriber device to a telecommunication network, the access authentication system comprising an operator access authentication system associated with the telecommunication network and a private access authentication system associated with a subscriber of the telecommunication network:

said operator access authentication system configured to:
receive an access request from a subscriber device attempting to access the telecommunication network;

responsive to detecting that the subscriber device is associated with a subscription that is managed by the private access authentication system, request authentication data for the subscriber device from the private access authentication system; and receive the authentication data in an authentication response returned from the private access authentication system;

determine from verification data included in the authentication response as to whether or not the private access authentication system is operating in a trusted state; and conditioned upon verifying that the private access authentication system is operating in the trusted state, perform authentication of the subscriber device using the authentication data returned for the subscriber device in the authentication response; and said private access authentication system configured to:
maintain subscription credentials for the subscriber device;

respond to the request for authentication data from the operator access authentication system by generating the verification data in a manner that proves that the private access authentication system is operating in the trusted state, and including the verification data together with authentication data associated with the subscription credentials in the authentication response returned to the operator access authentication system.

8. The access authentication system of claim 7, wherein the private access authentication system includes a Trusted Platform Module (TPM), and wherein the TPM is configured to verify that the private access authentication system is operating in the trusted state by verifying software running on the TPM.

9. The access authentication system of claim 7, wherein the operator access authentication system is configured to further condition the use of the authentication data for authenticating the subscriber device based on verifying that a certificate of the private access authentication system is valid.

10. The access authentication system of claim 7, wherein the operator access authentication system and the private access authentication system are configured to communicate over a secure connection.

11. The access authentication system of claim 7, wherein the operator access authentication system is configured to include a nonce in the request for the authentication data, and wherein the private access authentication system is configured to generate the authentication response in dependence on the nonce.

12. The access authentication system of claim 7, wherein the private access authentication system is configured to hold subscription credentials for the subscriber device, and to derive the authentication data from the subscription credentials.

13. The access authentication system of claim 7, wherein the operator access authentication system is further configured to perform authentication of a subscriber device that is associated with a subscription managed by the operator access authentication system, without use of the private access authentication system.

* * * * *